United States Patent
Piech

[15] 3,704,636
[45] Dec. 5, 1972

[54] COMBINED CRANKSHAFT FOR MULTI-CYLINDER PISTON ENGINES, ESPECIALLY INTERNAL COMBUSTION ENGINES

[72] Inventor: Ferdinand V. Piech, Gahkopf, Germany

[73] Assignee: Firma Dr. h. c. f. Porsche K.G., Stuttgart, Germany

[22] Filed: May 4, 1970

[21] Appl. No.: 34,130

[30] Foreign Application Priority Data

May 2, 1969 Germany........P 19 22 488.5

[52] U.S. Cl..................74/597, 29/6, 219/121 EB
[51] Int. Cl..................................F16c 3/10
[58] Field of Search............74/598, 597, 596, 595; 29/149.5, 6; 219/121 EB

[56] References Cited

UNITED STATES PATENTS

| | | |
|---|---|---|
| 1,731,215 | 10/1929 | Noble..........................74/597 |
| 3,537,333 | 11/1970 | Seifert et al. ................74/597 |
| 2,378,686 | 6/1945 | Carstens.......................74/597 |
| 3,458,683 | 7/1969 | Canonico et al.....219/121 EB |

Primary Examiner—William F. O'Dea
Assistant Examiner—F. D. Shoemaker
Attorney—Craig and Antonelli

[57] ABSTRACT

Jointed crankshaft for multi-cylinder piston engines, especially internal combustion engines, which crankshaft is split in the area of the crankpin and joined together through a butt joint by means of electron-beam welding. The crankshaft is split perpendicularly in the plane of one or more shaft journals and is provided at the butt joints of adjacent shaft journals with annular faces facing each other and, through the formation of ventilated hollow space, are joined together. An intermediate layer which serves as an adhesion joint can be interposed between the faces of the shaft journals. The crankshaft can also be provided with a drive gear having a spigot which ensures a satisfactory joint and accurate centering of the pieces to be welded.

10 Claims, 2 Drawing Figures

Inventor:
FERDINAND PIECH
By Craig, Antonelli, Stewart & Hill
Attorneys

3,704,636

COMBINED CRANKSHAFT FOR MULTI-CYLINDER PISTON ENGINES, ESPECIALLY INTERNAL COMBUSTION ENGINES

BACKGROUND OF THE INVENTION

The present invention relates to a combined crankshaft for multi-cylinder piston engines, especially internal combustion engines, and more particularly, to a combined crankshaft which is split in the area of the crankpin and joined together through a butt joint.

Joining of crankshaft halves are known, wherein the shaft journals are combined through tension rods or the like. This construction has the disadvantage, however, that considerable time and energy must be expended in the manufacture of such crankshafts and a high degree of accuracy must be attained. In addition, such a joining technique always presents the danger that the tension rod will develop axial clearance as a result of heat expansion, whereby the tooth construction is damaged and the joint loosened. With internal combustion engines in which the driving gear is fixed against rotation between the shaft journals, a joining of the shaft journals and gear is relatively expensive, so that an economical fabrication thereof is virtually impossible.

SUMMARY OF THE INVENTION

It is an aim of the present invention to overcome the above-mentioned problems and disadvantages by creating an assembly of the two crankshaft halves through electron-stream or beam welding.

It is a main object of the present invention to join individual shaft journals by simple means in such a way that the crankshaft forms a torsionally solid and undetachable unit, whereby only the welding seam has to be ground over after joining.

The underlying problems are solved in accordance with the present invention by perpendicularly splitting the crankshaft in the plane of one or more shaft journals and providing the crankshaft at the butt joints of adjacent shaft journals with annular faces facing each other and, through the formation of ventilated hollow space, are joined together by electronstream welding.

In an advantageous manner, the joining of the shaft journals is accomplished through the interposition of an intermediate layer serving as the adhesion joint. Preferably, the intermediate layer is formed as a foil which is positioned in the plane of the butt joints of the shaft journals.

The hollow space extending between the shaft journals is of special importance insofar as it is provided with ventilating bores extending perpendicularly to the axis of rotation. It is also advantageous to provide the driving gear with annular joint surfaces which protrude beyond the width of the teeth and solidly connected with the annular faces of the shaft journals in the case of a driving gear provided with the crankshaft.

Advantageously, the driving gear is provided with a spigot in the area of the bearing surfaces which extend into a reamed bore in the hollow space of the shaft journals. It is particularly advantageous that the spigot of the driving gear is provided in the area of the bearing surface with radially extending ventilating bores.

A still further advantage resides in that the driving gear is provided with annular relief grooves in the area adjoining the bearing surfaces. The joining of the butting or bearing surfaces of the driving gear with the faces of the shaft journals is advantageously accomplished by means of an annular disk arranged in the plane of the butt joint.

The advantages of the present invention reside particularly in the fact that, through the formation of the hollow space in the shaft journals of the crankshaft, joining by means of electron-stream welding is facilitated especially thereby and the tension stresses created during welding and the shrink forces during cooling of the material are advantageously held to a minimum.

The intermediate layer provided in the butt joint makes possible the assurance of a perfect weld with the use of carbon-free steel, whereby a further hardening of the weld seam is additionally avoided. By the formation of the intermediate layer as a foil, it may be made of different thickness according to the selection of the material to be welded together. Further, a simple placing onto the components to be welded is attained by means of the foil.

The ventilating bores extending into the hollow space facilitate the joint welding with the electron-stream welding method considerably, since the air escapes through the ventilating bores and the hollow space is held under a vacuum. A perfect joint of the welding seam is thereby attained.

In the case of joint welding of shaft journals with a drive gear, the electron-beam feed to the weld area is considerably facilitated through the selected precaution of the welding process. Further, a portion of the stresses in the work piece are equalized through the bearing surfaces provided.

By providing the driving gear with a spigot, a satisfactory joint and accurate centering of the pieces to be welded, which is required with electron-beam welding, is obtained at the same time. By means of the radially extending ventilation bores in the spigot, the weld seam is held securely under vacuum from the inside of the hollow space of the crankpin so that an optimum weld joint is attained throughout the entire weld surface. Annular relief grooves are provided in the driving gear, thereby extensively avoiding axial stresses during cooling of the weld area. If the driving gear is made of a material other than the crankshaft material, the electron-stream welding is accomplished preferably by inserting an annular disk into the butt joint. On one hand, the annular disk serves for a metallurgically exact weld joint and, on the other hand, provides for an elastic zone to absorb possible welding stresses.

BRIEF DESCRIPTION OF THE DRAWINGS

These and other aims, features and advantages of the present invention will become more apparent from the following description when taken in conjunction with the accompanying drawing which shows, for purposes of illustration only, several embodiments in accordance with the present invention and wherein.

DETAILED DESCRIPTION OF THE DRAWINGS

Figure 1:
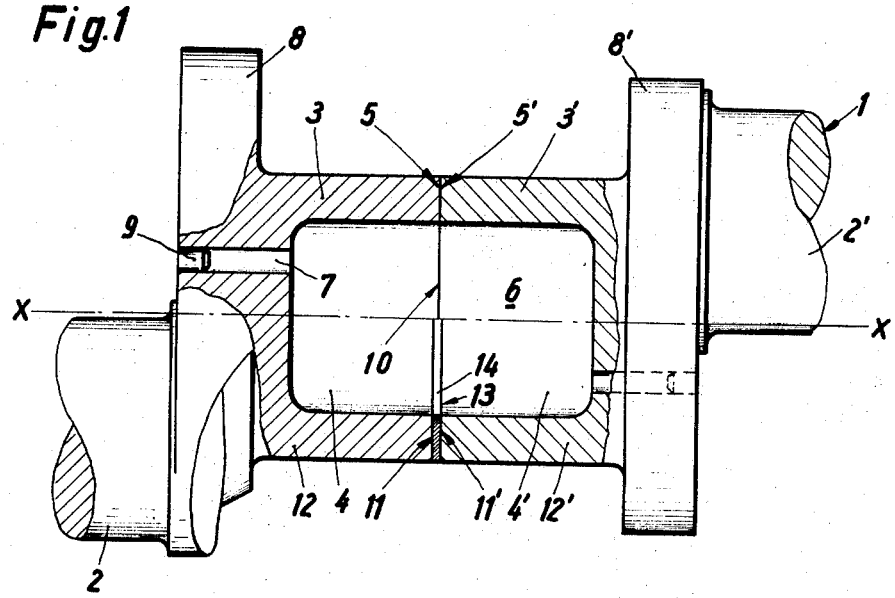
FIG. 1 is a partial cross-sectional side view of the present invention showing the joining of shaft journals of a crankshaft for an internal combustion engine, whereby the shaft journal joint is provided with an intermediate layer below the axis of rotation X—X.

Referring now to the drawing and, in particular, to FIG. 1, there is shown a crankshaft 1 for an internal combustion engine (not shown in detail) which consists of a number of crank portions 2, 2' which are directly joined to each other by means of electron-beam welding. For this purpose, the crank portions 2, 2' are provided with shaft journals 3, 3' which are provided with recesses 4, 4' in the axis of rotation X—X of the shaft journals 3, 3', whereby faces 5, 5' of the shaft journals are of annular cross-section. The faces 5, 5', through formation of a hollow space 6, face each other.

Parallel to the axis of rotation X—X, the hollow space 6 is connected through a vent bore 7 with the atmosphere of a weld chamber. The vent bores 7 pass through the crank webs 8, 8' of the crank portions 2, 2' and may be closed off by means of plugs 9.

A direct welded joint of crank portions 2, 2' is illustrated in FIG. 1 above the axis of rotation X—X. For adhesion jointing, an intermediate layer 13 in the form of a weld foil 14 is provided in the area of the butt joint 10 between the annular faces 11, 11' of the shaft journals 12, 12', as seen below the axis of rotation X—X.

Figure 2:
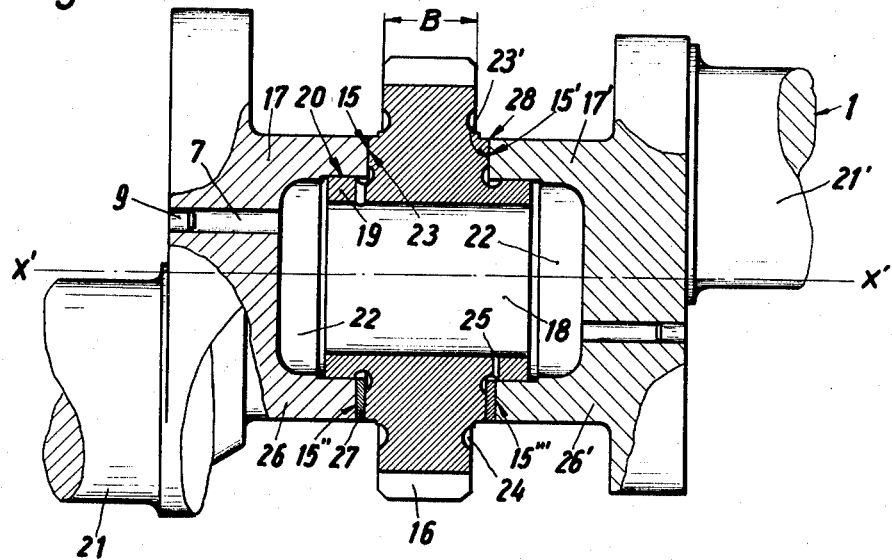
FIG. 2 is a partial cross-sectional side view of the present invention showing the joining of shaft journals for a crankshaft including a driving gear, whereby the shaft journal point is provided with an annular disk below the axis of rotation X—X.

As seen above the axis of rotation X'—X' in FIG. 2, a driving gear 16 is inserted between the annular faces 15, 15' with the crankshaft joining. The driving gear is provided with a bore 18 in the axis of rotation X'—X' of the shaft journals 17, 17' and is also provided with a spigot 19 inserted into a reamed bore 20 of the shaft journals 17, 17' and centered therein. The reamed bore 20 extends from the annular faces 15, 15' of the shaft journals 17, 17' to the hollow space 22 common to both crank portions 21, 21'.

The driving gear 16 is provided with butting surfaces 23, 23' which abut against the faces 15, 15' of the shaft journals 17, 17'. The butting surfaces 23, 23' extend beyond the tooth width B of the driving gear 16. In the area of the butting surfaces 23, 23', the driving gear 16 is provided with annular relief rings 24 arranged concentrically with the axis of rotation X'—X'.

Venting bores 25 are provided in the spigot 19 arranged perpendicularly to the butting surfaces 23, 23'. For shaft journals 26, 26' having a high carbon content or with the driving gear 16 and shaft journals 26, 26' made of different metals, it is suggested that an annular disk 27 be inserted in the plane of the butt joint 28 between adjacent surfaces 15'', 23/15''', 23' as shown below the axis of rotation X'—X' in FIG. 2.

For joining the crank portions 2, 2' with each other and the crank portions 21, 21' at the driving gear 16 by means of the electron-beam welding method, the faces 5, 5' as well as surfaces 15, 23 and 15', 23' are held against each other under a predetermined amount of pressure in a device which serves simultaneously as a centering means. Welding is accomplished in a welding chamber of the electron-beam welding device (not shown) under vacuum of the magnitude of $10^{-4}$ mm Hg. By means of the vent bores 7, 25, the required vacuum is maintained at each position of the butt joint 10, 28, whereby a satisfactory weld joint is possible. The vent bores 7 are closed with plugs 9 after the welding process has been completed.

Since the welding method is performed in a vacuum, the electron-beam welding technique is very suitable for joining heat-resisting metals such as, for example, tungsten, niobium, molybdenum and tantalum as well as the easily oxidizing metals such as beryllium, titanium and zircon in addition to the vacuum-melted alloys.

If the shaft journals 12, 12', 26, 26' consist of a metal with a high carbon content, a material is selected for the intermediate layer 13 or annular disk 27 of largely pure nickel- or vanadium alloy in order to accomplish a weld-joining. In the process of welding of the butt joints 10, 28, the intermediate layer 13 or the annular disk 27 prevent the martensite formation of the shaft journals 12, 12', 26, 26' to be welded, that is, the intermediate layer 13 or the annular disk 27 respectively alloys the adjacent surfaces 11, 11', 15'', 23 and 15''', 23' for a better composition during the welding process so that later cracks formed during heat treatment are avoided. The intermediate layer 13 and the annular disk 27 form, at the same time, an elastic zone and avoid thereby a hardness formation in the weld seam. By means of the annular relief grooves 24 of the driving gear 16, stresses in the working material which occur during and after the welding process are largely avoided.

While I have shown and described several embodiments in accordance with the present invention, it is to be clearly understood that the same is susceptible of numerous changes and modifications as will be apparent to one of ordinary skill in the art, and I, therefore, do not wish to be limited to the details shown and described herein but intend to cover all such changes and modifications as are encompassed by the scope of the present invention.

I claim:

1. Jointed crankshaft for multi-cylinder piston engines, especially internal combustion engines, having shaft journals and a drive gear between the shaft journals, characterized in that the drive gear is provided with annular butting surfaces which extend beyond the tooth width of the drive gear and are fixedly connected with the annular faces of the shaft journals.

2. Jointed crankshaft according to claim 1, wherein the shaft journals are provided with a hollow space having a reamed bore, and the drive gear is provided with spigot means in the area of its butting surfaces extending into the reamed bore.

3. Jointed crankshaft according to claim 2, wherein the spigot means is provided, in the area of the butting surfaces, with radially arranged vent bores.

4. Jointed crankshaft according to claim 1, wherein the drive gear is provided, in the area of the adjacent butting surfaces, with annular relief groove means.

5. Jointed crankshaft according to claim 4, wherein the shaft journals are provided with a hollow space having a reamed bore, and the drive gear is provided with spigot means in the area of its butting surfaces extending into the reamed bore.

6. Jointed crankshaft according to claim 5, wherein the spigot means is provided, in the area of the butting surfaces, with radially arranged vent bores.

7. Jointed crankshaft according to claim 1, wherein annular disk means are arranged in the plane of the butt joints for joining the butting surfaces of the drive gear with the faces of the shaft journals.

8. Jointed crankshaft according to claim 7, wherein an electronibeam welded joint is provided for joining together the split crankshaft.

9. Jointed crankshaft according to claim 8, wherein the shaft journals are provided with a hollow space having a reamed bore, and the drive gear is provided with spigot means in the area of its butting surfaces extending into the reamed bore.

10. Jointed crankshaft according to claim 9, wherein the spigot means is provided, in the area of the butting surfaces, with radially arranged vent bores.

* * * * *